(12) United States Patent  
Whillock et al.

(10) Patent No.: US 8,150,970 B1
(45) Date of Patent: Apr. 3, 2012

(54) WORK LOAD DISTRIBUTION AMONG SERVER PROCESSES

(75) Inventors: Asa Whillock, San Francisco, CA (US); Srinivas Manapragada, Fremont, CA (US); Pritham Shetty, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 911 days.

(21) Appl. No.: 11/871,903

(22) Filed: Oct. 12, 2007

(51) Int. Cl.
*G06F 15/173* (2006.01)
(52) U.S. Cl. ........................ 709/226; 709/219
(58) Field of Classification Search .................. 709/226
See application file for complete search history.

(56) References Cited

U.S. PATENT DOCUMENTS

| | | | |
|---|---|---|---|
| 5,937,162 A * | 8/1999 | Funk et al. ................ | 709/206 |
| 5,991,808 A | 11/1999 | Broder et al. | |
| 6,055,564 A | 4/2000 | Phaal | |
| 6,128,279 A | 10/2000 | O'Neil et al. | |
| 6,442,550 B1 | 8/2002 | Rajamony | |
| 6,470,389 B1 * | 10/2002 | Chung et al. .............. | 709/227 |
| 6,574,612 B1 | 6/2003 | Baratti et al. | |
| 6,862,606 B1 * | 3/2005 | Major et al. ............... | 709/203 |
| 7,062,570 B2 | 6/2006 | Hong et al. | |
| 7,272,658 B1 | 9/2007 | Edelman et al. | |
| 7,512,707 B1 | 3/2009 | Manapragada et al. | |
| 2002/0049842 A1 | 4/2002 | Huetsch et al. | |
| 2002/0143965 A1 | 10/2002 | Aiken, Jr. | |
| 2002/0144283 A1 * | 10/2002 | Headings et al. ........... | 725/109 |
| 2002/0198883 A1 | 12/2002 | Nishizawa et al. | |
| 2003/0055965 A1 | 3/2003 | Colby et al. | |
| 2003/0061378 A1 * | 3/2003 | Mazzitelli .................. | 709/238 |
| 2003/0188013 A1 | 10/2003 | Nishikado et al. | |
| 2003/0223413 A1 * | 12/2003 | Guerrero .................... | 370/389 |
| 2004/0197079 A1 | 10/2004 | Latvala et al. | |
| 2006/0036747 A1 * | 2/2006 | Galvin et al. ............... | 709/228 |
| 2006/0233106 A1 * | 10/2006 | Achlioptas et al. ......... | 370/235 |
| 2006/0253453 A1 | 11/2006 | Chmaytelli et al. | |

FOREIGN PATENT DOCUMENTS

EP 849921 A2 * 6/1998

OTHER PUBLICATIONS

Engelschall, Ralf. "Apache 1.3 URL Rewriting Guide." Dec. 1997, Apache Group: <http://httpd.apache.org/docs/1.3/misc/rewriteguide.html>. pp. 1-24.*

Strahl, Rick. "Web Farming with the Network Load Balancing Service in Windows Server 2003." Jun. 4, 2003, West Wind Technologies: <http://www.west-wind.com/presentations/loadbalancing/networkloadbalancingwindows2003.asp>. pp. 1-12.*

(Continued)

*Primary Examiner* — Christopher Biagini
(74) *Attorney, Agent, or Firm* — Fish & Richardson P.C.

(57) ABSTRACT

Technologies relating to work load distribution. A request is received for access to one of n server processes, where n is an integer greater than one. A mixing function is applied to an identifier associated with the request to generate a reproducible output representative of the identifier. A modulo operation is applied to the output, where a dividend in the modulo operation is the output and a divisor in the modulo operation is n, to determine a remainder. The request is assigned to a server process from the n server processes in accordance with the remainder.

11 Claims, 5 Drawing Sheets

OTHER PUBLICATIONS

"Module mod_rewrite: URL Rewriting Engine". Apache Software Foundation. Archived by the Internet Archive on Jul. 25, 2005: <http://web.archive.org/web/20050725003249/http://httpd.apache.org/docs/1.3/mod/mod_rewrite.html>. pp. 1-23.*

"Configuring Real Servers and Server Farms". Cisco Systems, Inc. Archived by the Internet Archive on Mar. 5, 2006: <http://web.archive.org/web/20060305003127/http://www.cisco.com/en/US/products/hw/switches/ps708/module_installation_and_configuration_guides_chapter09186a008022ff43.html>. pp. 1-7.*

Chen, Mingyu et al, "The Design of High Availability in the Dawning Server Consolidation System" *HPC-Asia 2000*, Beijing, China, Jan. 2001, pp. 436-438.

"Hash Function" Wikipedia [online] Sep. 20, 2007 <URL: www.en.wikipedia.org/wiki/Hash_function> [retrieved Sep. 20, 2007], 5 pages.

"Modulo" Wikipedia [online] <URL: www.en.wikipedia.org/wiki/modulo_operation> [retrieved Sep. 20, 2007], 1 page.

"Using Outlook Web Access with Windows Load Balancing Service" Microsoft.com [online] Jul. 23, 2001 <URL: http://www.microsoft.com/technet/prodtechnol/office/office2000/maintain/featusability/ow...> [retrieved Nov. 11, 2006], 2 pages.

"Cryptographic hash function", Wikipedia [online], [retrieved on Sep. 20, 2007]. Retrieved from the Internet: <URL: http://en.wikipedia.org/wiki/Cryptographic_hash_function>, 8 pages.

Penchikala, Srini, "Clustering and Load Balancing in Tomcat 5, Part 1", O'Reilly ONJava.com [online], [retrieved on Oct. 12, 2006]. Retrieved from the Internet: <URL: http://www.onjava.com/pub/a/onjaval2004/03/31/clustering.html>, 7 pages.

* cited by examiner

WORK LOAD DISTRIBUTION AMONG SERVER PROCESSES

TECHNICAL FIELD

The present disclosure relates to work load distribution.

BACKGROUND

A system employing multiple server processes to perform work in response to requests, for example, received from applications, distributes the work to the multiples server processes according to some algorithm. The multiple server processes may be executing on multiple servers or executing on a single server. A conventional technique for work distribution is a round-robin algorithm. While this technique can ensure fairness of work distribution, the particular server processes assigned to perform work for a particular application is random and can differ each time the application makes a request. That is, there is no affinity to a particular server process for one application.

SUMMARY

This specification describes technologies relating to work load distribution. In general, one aspect of the subject matter described in this specification can be embodied in a method that includes receiving a request for access to one of n server processes, where n is an integer greater than one. A mixing function is applied to an identifier associated with the request to generate a reproducible output representative of the identifier. A modulo operation is applied to the output, where a dividend in the modulo operation is the output and a divisor in the modulo operation is n, to determine a remainder. The request is assigned to a server process from the n server processes in accordance with the remainder. Other embodiments of this aspect include corresponding systems, apparatus, and computer program products.

These and other embodiments can optionally include one or more of the following features. The mixing function can be a hash function. The n server processes can be n core processes executable on a media server. Each server process can be executable on one of n servers, or all or a portion of the server processes can be executable on a single server. In one example, the identifier is a universal resource identifier. In some implementations, the number of server processes, n, is a prime number.

The method can further include receiving a selection of a point within a hosting hierarchy at which to distribute requests to the n server processes. A portion of the identifier can be extracted based on the selected point. The mixing function can be applied to the portion of the identifier extracted based on the selected point. The number of server processes, n, can be independent of the point selected within the hosting hierarchy. An input can be specifying the number of server processes, n. Extracting a portion of the identifier based on the selected point of the hosting hierarchy can include ignoring identifier information corresponding to a hierarchical level lower than the selected hierarchical point.

In some implementations, the n server processes are n core processes executable on a media server. The hierarchical levels include the media server at a first level, one or more adaptors at a second level, one or more virtual hosts at a third level, one or more applications at a fourth level and one or more application instances at a fifth level.

Particular embodiments of the subject matter described in this specification can be implemented to realize one or more of the following advantages. A work load can be distributed across multiple server processes with fairness while consistently distributing work from a particular source to the same server process. In terms of fairness, the techniques described herein can provide that the assignment of work to server processes is as close to x/n as possible, where n is the number of server processes and x is the number of work requests.

A system requiring work load distribution can be configurable such that a point in a hosting hierarchy at which to distribute work can be selected by a system operator. The selected point can be any point within the hierarchy and can be changed from time to time. To provide further flexibility, a number of server processes available to handle work requests can be configurable independent of the selected point within the hierarchy.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
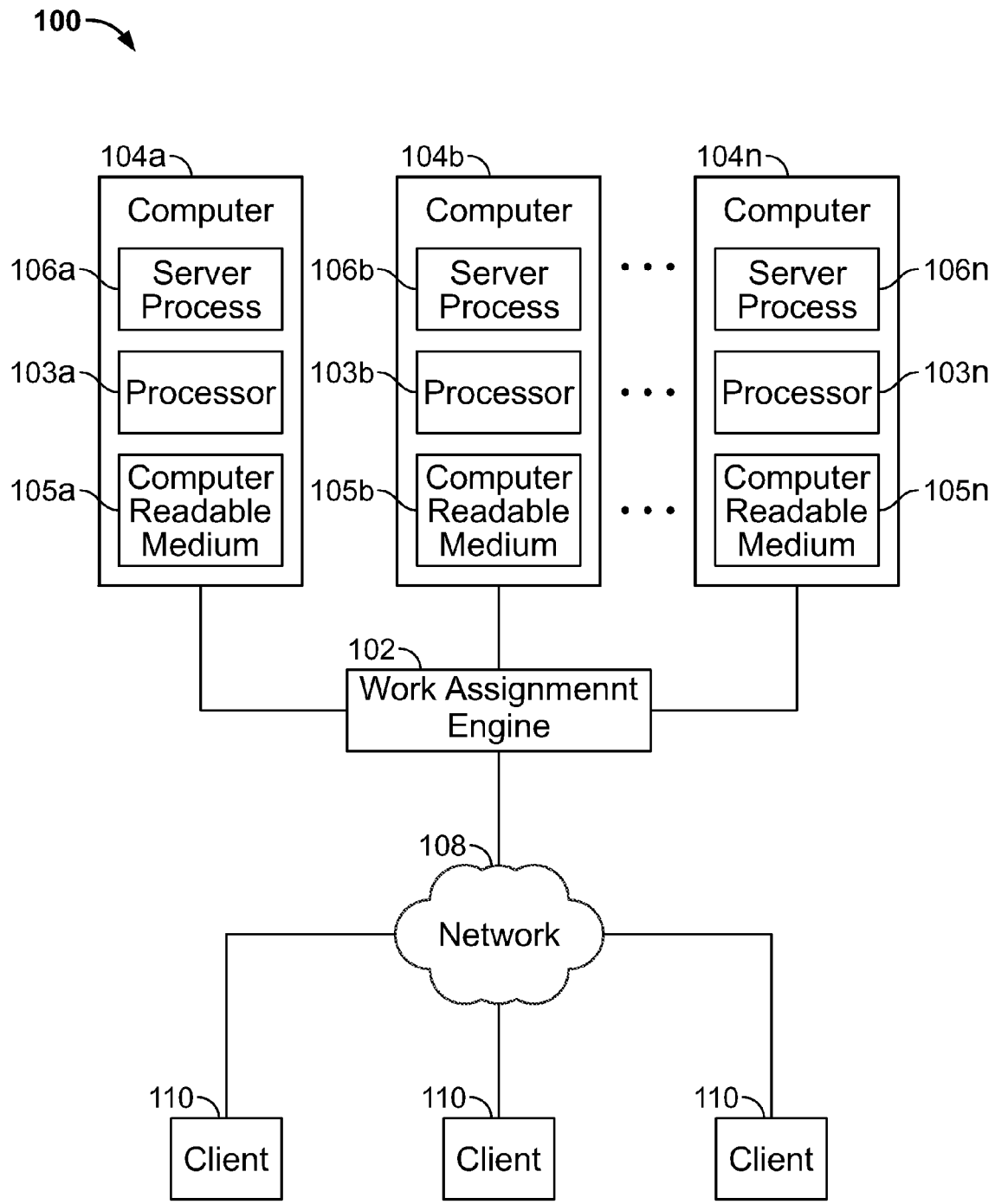
FIG. 1 is schematic block representation of an example system distributing work.

Techniques, computer programs and systems are described to facilitate work distribution among multiple server processes. By way of illustrative example, FIG. 1 shows an example system for work distribution. The system 100 includes a work assignment engine 102 and multiple computers 104a-n. The work assignment engine 102 receives requests for access to a server process, and distributes the requests to the multiple server processes 106a-n executable on the multiple computers 104a-n. In the example shown, requests are received over a network 108 from multiple clients 110. By way of illustrative example, a "client" may be an application requiring work.

As mentioned above, the multiple server processes 106a-n are executable on the multiple computers 104a-n. In the particular example shown, one server process is executable on each computer. However, in other implementations, multiple server processes can be executable on each computer, or the multiple computers 104 a-n can be replaced by a single computer on which the multiple server processes are executable. Each computer 104a-n includes at least one processor 103 a-n and a computer readable medium 105a-n.

The techniques, computer programs and systems described herein provide for work distribution among the multiple server processes 106a-n that balances both fairness and affinity. That is, in terms of fairness the work is fairly distributed to the multiple server processes 106a-n. However, at the same time, the work originating from a particular source can consistently be assigned to the same server process.

Figure 2:
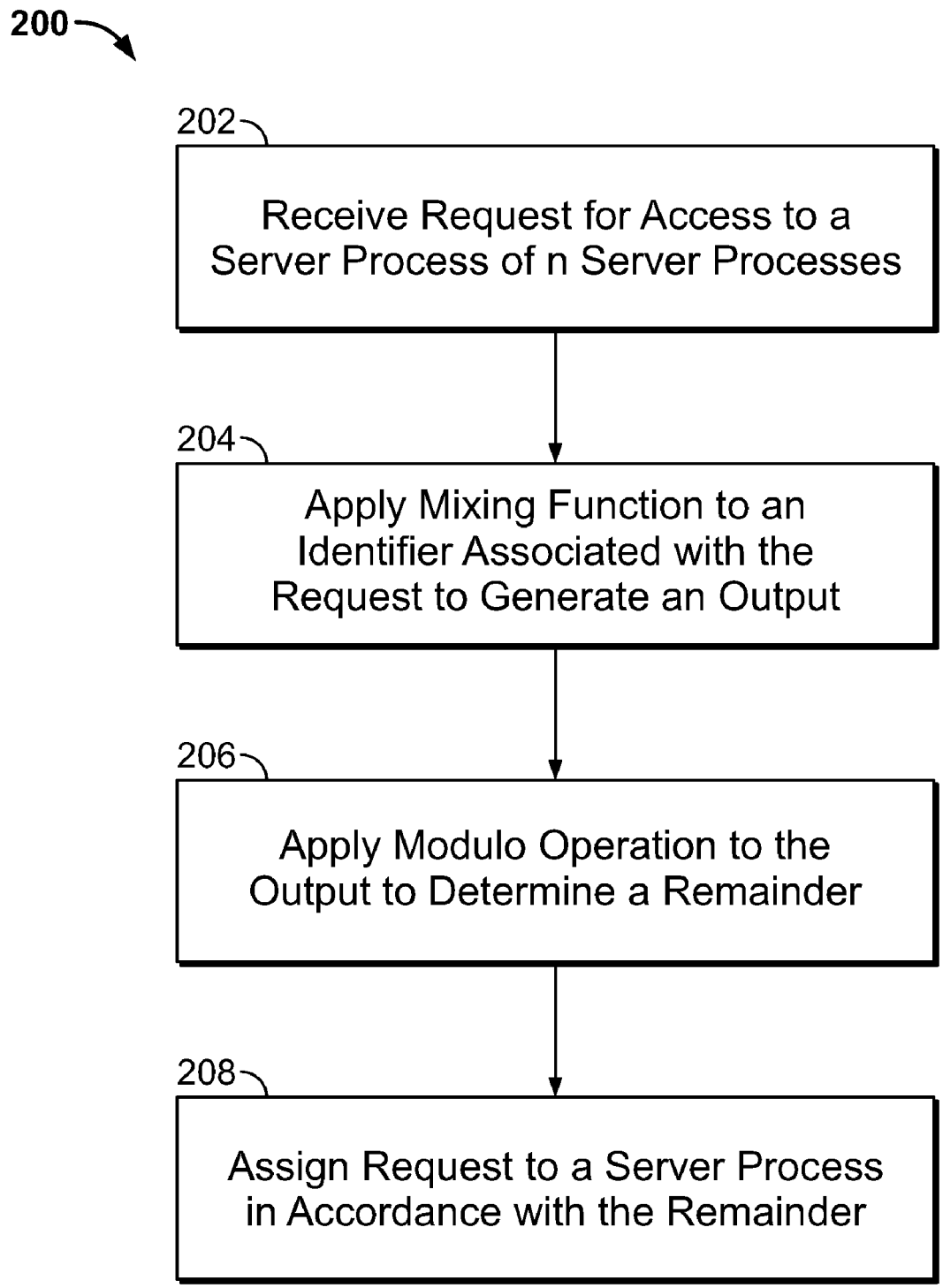
FIG. 2 is a flowchart showing an example process for distributing work.

FIG. 2 shows an example process 200 for distributing work among multiple server processes, providing fairness and affinity in the work distribution. A request for access to a server process from n server processes, where n is an integer greater than 1, is received 202. For example, in some implementations, the request can be received by the work assignment engine 102 shown in the system 100 of FIG. 1. A mixing function is applied 204 to an identifier associated with the request to generate a reproducible output representative of the identifier. For example, in some implementations, the request can be in the form of a URI (universal resource identifier). The mixing function can be a hash function that takes the request, i.e., the input string, as input and mixes the content of the string and produces a unique number. The function delivers the same answer for the same input every time, i.e., a reproducible result. However, even the most minor change in the input string can produce a significantly different output. This can be advantageous when receiving multiple requests that have quite similar identifiers. In one example, the hash function is a cryptographic hash function. In some implementations, the hash function is SHA-256. In other implementations, the hash function is FNV.

A modulo operation is applied 206 to the output from the mixing function to determine a remainder. The dividend in the modulo operation is the output and the divisor in the modulo operation is n. The request is assigned 208 to a server process in accordance with the remainder.

Referring again to FIG. 1, in the example system 100 shown, the requests for access to a server process are received and handled by a work assignment engine. An engine, as the term is used throughout this application, can be a piece of hardware that encapsulates a function, can be firmware or can be a software application. An engine can perform one or more functions, and one piece of hardware, firmware or software can perform other functions in addition to those of the work assignment engine. Similarly, more than one piece of hardware, firmware and/or software can be used to perform the functions of the work assignment engine.

Figure 3:
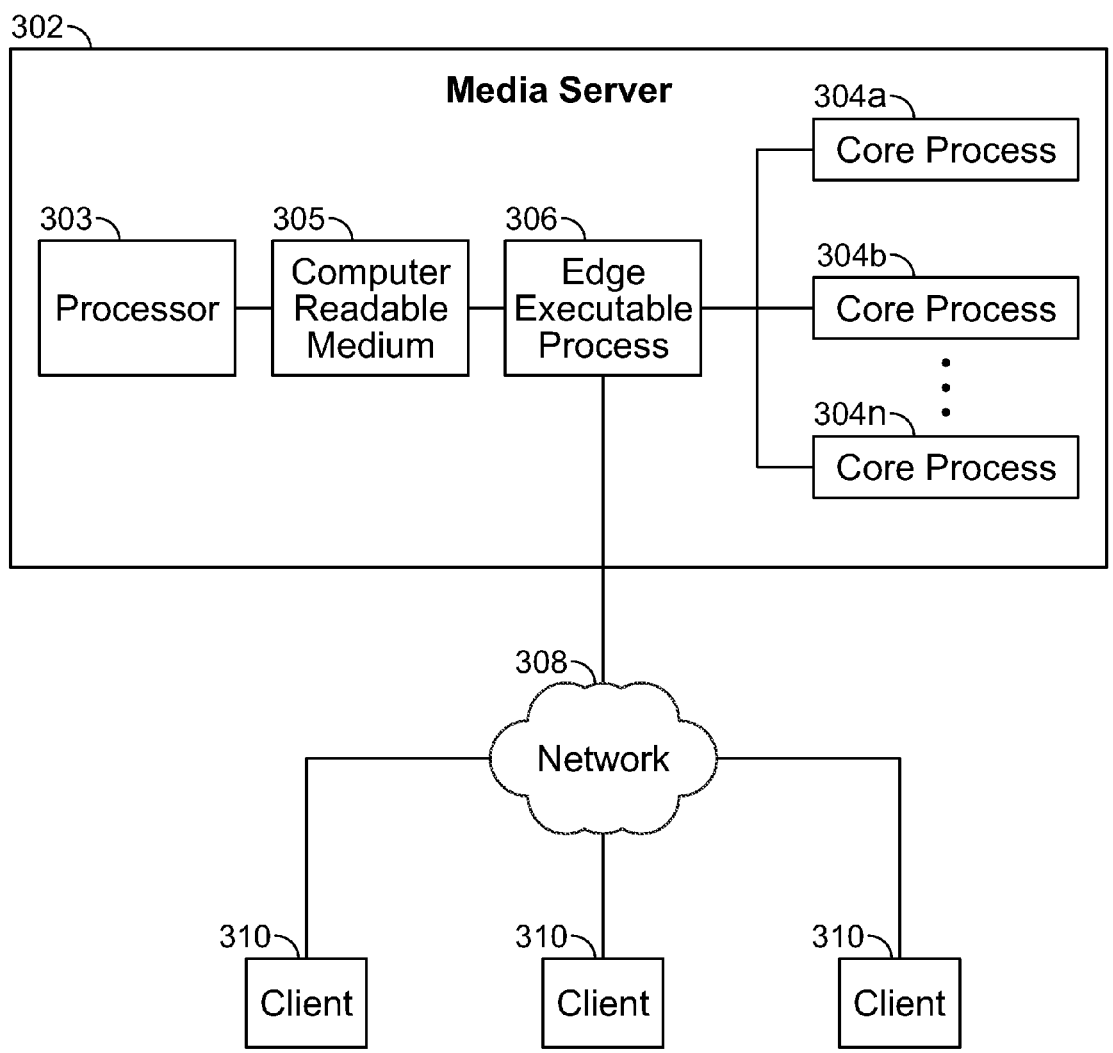
FIG. 3 is a schematic block representation of an example media server environment.

Referring to FIG. 3, one illustrative example of a system 300 is shown that can implement the process 200 for work distribution shown in FIG. 2. In this example, the system includes a media server 302, e.g., a flash media server. The media server 302 receives requests for work to be processed by core processes 304a-n executable on the media server 302. In the particular example shown, the requests for work are received and the work is assigned by an edge executable process 306. That is, the edge executable process 306 performs functions similar to the work assignment engine 102 discussed above in relation to FIG. 1. In the implementation shown, the requests are received over a network 308 from multiples clients 310. The media server 302 includes at least one processor 303 and a computer readable medium 305.

Figure 4:
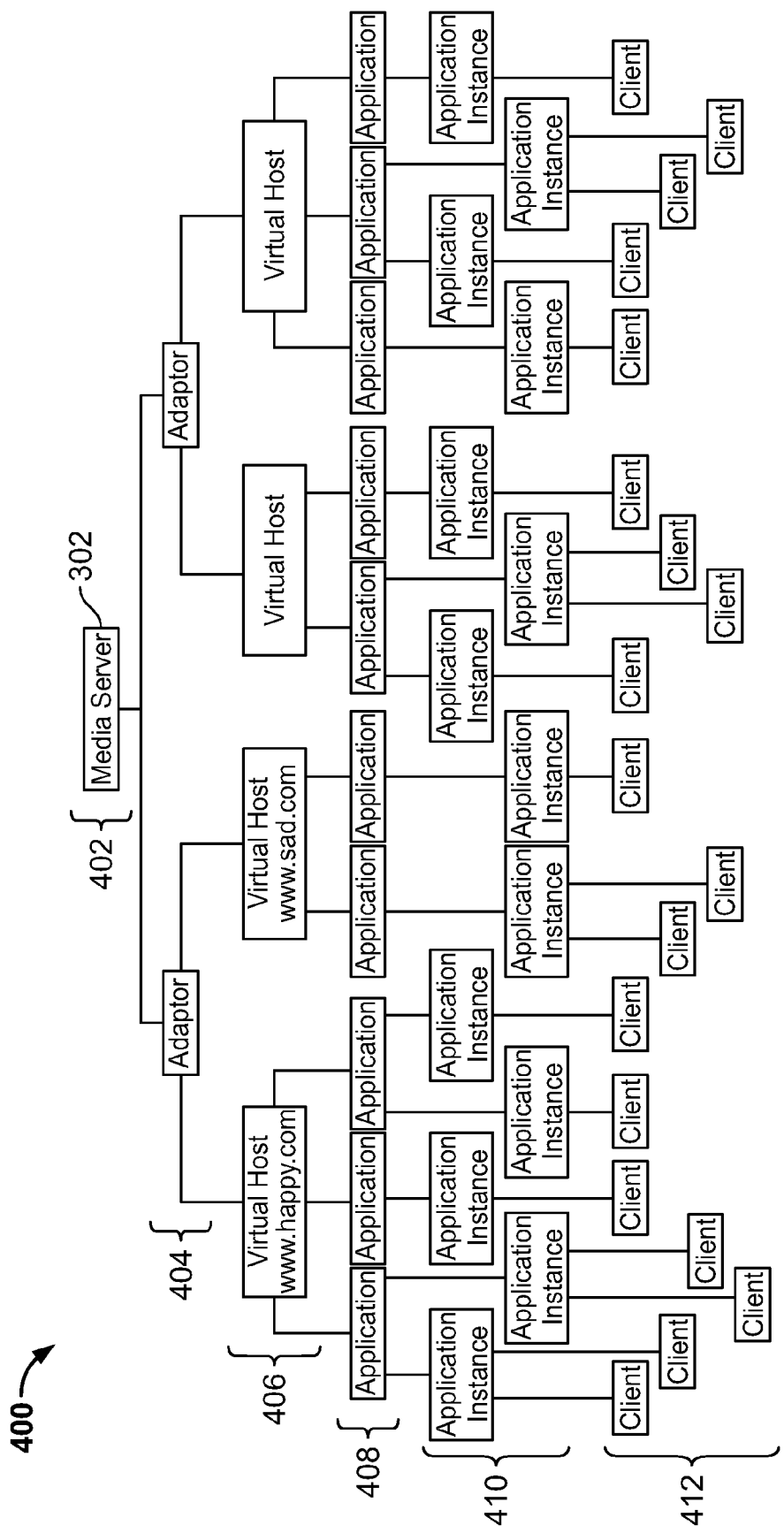
FIG. 4 is a schematic representation of a hosting hierarchy.

Referring to FIG. 4, a hosting hierarchy 400 is shown for distributing work. In this example hosting hierarchy 400, the media server 302 is at the top level 402. In some implementations, the levels of the hierarchy described below are controlled by a server administrator, that is, an administrator that installed the media server 302 and has access to the operating system of the media server. At a second level 404 are one or more adaptors. Each adaptor can represent a listening address/network port combination. The adaptors can be distinct so different applications and actions can be taken depending on the network interface from which they approach the media server 302.

At a third level 406 are multiple virtual hosts. Each adaptor has at least one virtual host. A virtual host represents a name resolution by which the media server 302 can be addressed. For example, the media server 302 can be known as www.happy.com and by www.sad.com. Each name can resolve to the same physical server, i.e., media server 302, and can resolve to the same network adaptor, but to the two different named virtual hosts, i.e., www.happy.com and www.sad.com respectively.

The following additional levels in the hierarchy can further be controlled by application developers. The application developers can be administrators, but also can be client that purchase time or application space on an otherwise hosted media server, e.g., media server 302. The clients' access can be limited to one virtual host or less, and they can be expected to contain their actions to only said virtual host.

At a fourth level 408 are applications. Each virtual host can have one or more applications. Each application can be considered a unique work setting. Generally, an application has a unique purpose, such as hosting a live video chat. Another example, is providing recorded media playback.

At a fifth level 410 are application instances. Each application, upon activation, lives within an instance of that application. Each instance of an application can be identical and provides the application's behavior to a unique single or set of clients. For example, there may be five instances present of a live video chat, with each instance containing two clients chatting to each other.

At a sixth level 412 are clients. Application instances are launched and kept active by the presence of clients. A client can be the server representation of an end user. For example, one client participating in a live chat is a first client. The other client that the first client is chatting to is a second client.

The hosting hierarchy 400 represents a logical way that the media server 302 can divide its work. The host operating system where the media server 302 lives, divides work into processes, that is, individual executables that run and are scheduled by the operating system to share time on the single media server 302. In some implementations, the media server 302 handles its work within individual processes called cores.

In one example implementation where the media server 302 is a Flash media server, the work arrives at the media server 302 by Flash Players connecting to the media server 302. Each Flash Payer connection can arrive with a certain application instance as a target for connecting. The target can be determined from the incoming identifier of the connection. For example, the identifier can be a URI. Consider for illustrative purposes the following URI that represents a request for work:

rtmp://www.happy.com/happyApplication/someInstance

The URI includes all of the information to determine each level of the hierarchy 400 that will receive the work corresponding to this request. For example, the application is happyApplication. Typically, a client's computer contacts a DNS server to resolve the website address, e.g., www.happy.com, into an IP address. The IP address combined with the port receiving the request for work can be used to identify the adaptor. The name "happy.com" can be used to identify the virtual host.

By way of illustrative example, consider a situation where incoming requests for work to be processed by the media server 302 are distributed at the application instance level, i.e., level 410 in the hierarchy. In this example, there are 14 application instances. The same number of core processes can be provided as there are number of application instances, i.e., in this example 14. In this example, an identifier for the incoming work request is the URI provided above, i.e., rtmp://www.happy.com/happyApplication/someInstance. A hash function is applied to generate a unique number representing the identifier, for example, the number 12345. The modulo operation is then applied, where the dividend is 12345 and the divisor is the number of core processes, i.e., 14.

The remainder is determined in this example to be "11". The work request is therefore assigned to the core process mapped to the remainder of "11".

The next time a work request is received from the same source, i.e., the same application instance having the same URI, the request will be sent to the same core process. That is, the hash function will again generate the unique number 12345 and the modulo operation will generate the same remainder of "11". Accordingly, affinity is achieved, as the work from the same application instance is always sent to the same core process.

Because the hash function is a mixing function, meaning small changes in the input cause large changes in the output, fairness in distribution to the 14 core processes can be achieved even when the application instances have similar identifiers. Consider the example where one application instance has the identifier: rtmp://www.happy.com/happyApplication/Instance1 and a second application instance has the identifier: rtmp://www.happy.com/happyApplication/Instance2. The only difference between the two identifiers is the last digit, and even so, the different digits are numerically adjacent. However, the output from the hash function for each of these two identifiers can produce significantly different numbers. When the modulo operation is then applied to the different numbers, the statistical chance of obtaining different remainders is also spread out, and the work can be spread among the core processes.

In some implementations, the number of server processes, i.e., the "n" value, is a prime number. It has been found that in some implementations using a prime number as the divisor in the modulo operation can enhance the ability to provide work assignments spread over all n server processes.

In other implementations, a system operator can select a point within the hosting hierarchy at which to distribute work requests. Affinity can then be guaranteed for that point within the hierarchy. That is, using the hierarchy 400 in FIG. 4 as an example, if the selected point is the virtual host 406 level, then each time a work request is received associated with a particular virtual host, it will always be assigned to a particular server process.

Figure 5:
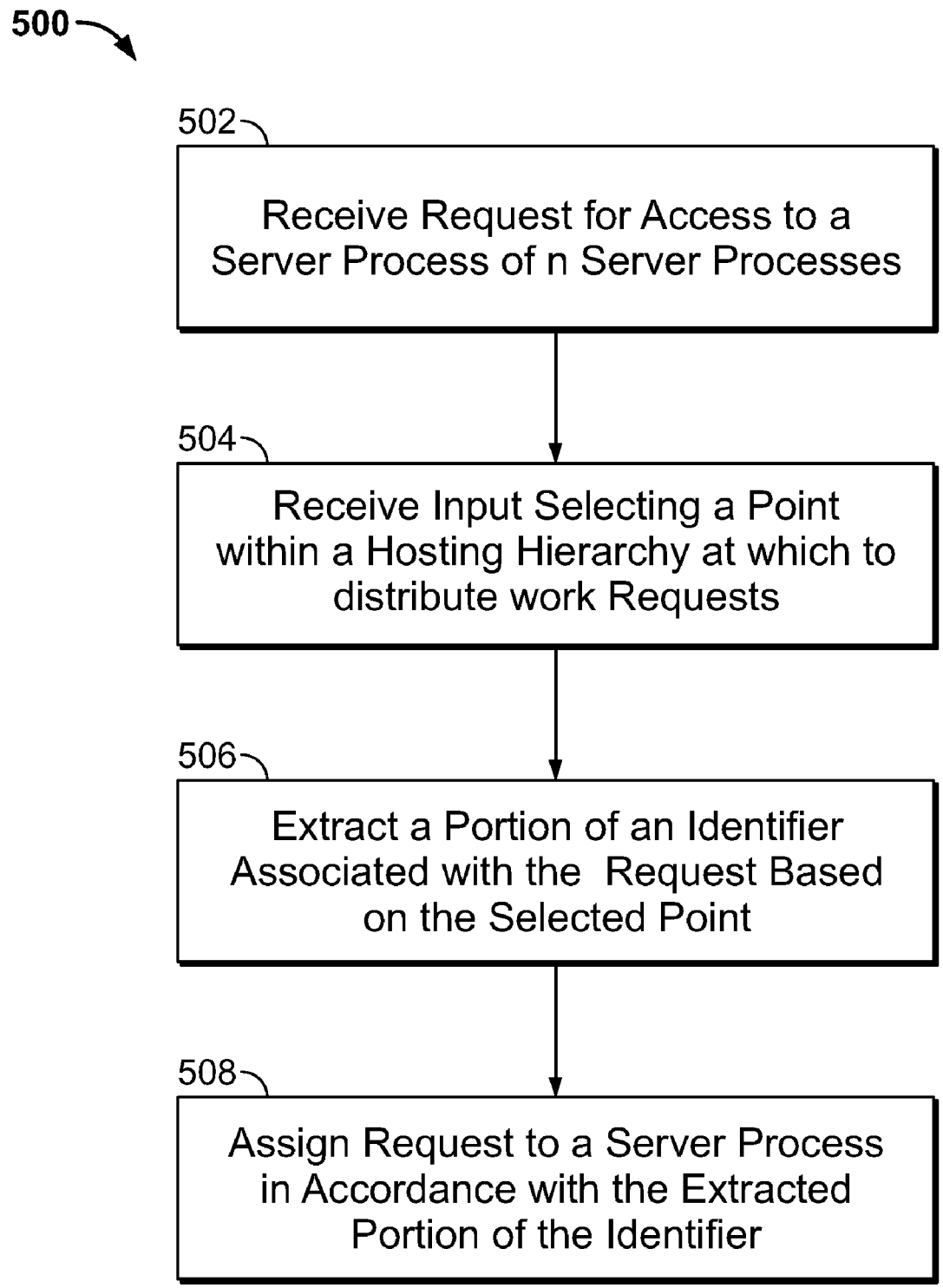
FIG. 5 is a flowchart showing an example process for distributing work at a selected level in a hosting hierarchy.

FIG. 5 is a flowchart showing an example process 500 for assigning work requests in accordance with a selected point in a hierarchy. A request for access to a server process of n server processes is received 502. The request is associated with an identifier. For illustrative purposes, consider an example where the identifier is a URI that reads as follows:

rtmp://www.happy.com/myApplication/myInstance

In some implementations, the request can be received by a work assignment engine, such as work assignment engine 102 shown in the system 100 in FIG. 1. An input is received 504 selecting a point within a hosting hierarchy at which to distribute work requests to the n server processes. By way of illustrative example, a system operator can input a selection of "Application", i.e., level 408 in the example hierarchy 400, as the point at which to distribute work requests.

A portion of the identifier is extracted 506 based on the selected hierarchical point. For example, the URI provided above can be truncated to remove any information about hierarchical levels below the selected point in the hierarchy. The extracted portion of the identifier is therefore:

rtmp://www.happy.com/myApplication

In this example, www.happy.com represents the virtual host and "myApplication" represents the application. The application instance information, i.e., "myInstance" is truncated.

In other implementations, the extracted portion can be just the application name, e.g., "myApplication". In yet other implementations, the extracted portion can be the virtual host name and the application name, e.g., www.happy.com/myApplication.

The request for work is assigned 508 to a server process of the n server processes in accordance with the extracted portion of the identifier. In some implementations, the request for work is assigned using the techniques described above. That is, a mixing function is applied to the extracted portion of the identifier to generate a reproducible output representative of the extracted portion of the identifier. For example, a hash function can be applied to generate a large number. A modulo operation is performed on the output of the mixing function, where the output is the dividend and n is the divisor. The remainder calculated from the modulo operation is used to map the request to a server process of the n server processors.

Each time a request for work is received that is associated with a specific application, e.g., myApplication, the work can be guaranteed to be assigned to the same server process. That is, in the example where the application name forms the extracted portion of the identifier, the same portion of identifier is used to assign the work every time for that particular application, regardless of the particular application instance or client also associated with the request. Because the same portion of identifier is always used, in the implementation where a mixing function and modulo operation are employed to calculate a remainder that is used to map to a server process, the same remainder is always calculated and therefore the same server process is always assigned the work request in relation to the same application. The same result occurs in other implementations, for example, where the virtual host name is included in the extracted portion, if the application always calls the same virtual host (i.e., because again the extracted portion of the identifier is always the same).

In other examples, the selected point in the hierarchy can be a different point. The system operator has the flexibility to select any point in the hierarchy at which to distribute work requests, and thereby guarantee affinity at that point. Further, in some implementations, the system operator can change the selected point from time to time, thereby providing further flexibility in the system.

In the examples above, the selected point in the hierarchy represented a level in the hierarchy. However, in other implementations the selected point can be other than a specified level. For example, a system operator can selected that the extracted portion of the identifier include the first three characters of the application name only, and that any remaining characters in the application name be ignored. By way of illustration, referring to the example URI above, the extracted portion can be any of the following, depending on the rule employed for extraction (i.e., everything up to the extraction point; virtual host+application name only or name only):

rtmp://www.happy.com/myA
www.happy.com/myA
myA.

In other implementations, the selected point within the hierarchy can be specified by indicating a subset of characters in the identifier to use as the extracted portion, with the balance of the characters being ignored. By way of illustration, again referring to the example URI above, a system operator can select that characters 12 through 24 in the identifier form the extracted portion of the identifier, in which case the extracted portion would read as follows:

happy.com/myA

The first 11 characters, i.e., "rtmp://www." are ignored, as are anything after the $24^{th}$ character, "A". The above are illustrative examples to show the inherent flexibility in the system. Any point, however specified, can be selected within the hosting hierarchy at which to distribute the work.

In some implementations, the number of server processes, n, is dependent on the number of elements in the hierarchical level at which work is distributed. Referring again to FIG. 4 for illustrative purposes, if work is to be distributed at the virtual host level 406 since there are 4 virtual hosts, then 4 server processes can be employed. Accordingly, one server process is used to handle all work requests from a particular virtual host. If the work is to be distributed at the application level 408 and there are 10 applications, then 10 server processes can be employed.

In other implementations, the number of server processes, n, is independent of the hierarchical level selected at which to distribute work. That is, a system operator, for example, can select a number of server processes to employ independent of the selected hierarchical level at which work is to be distributed and the number of elements included in the selected level.

By way of illustrative example, consider a server having two adaptors. Each adapter has 5 virtual hosts, for a total of 10 virtual hosts. Each virtual host includes 10 applications, for a total of 100 applications. If the selected level in the hierarchy at which to distribute work is the adaptor level, then in an implementation where the number of server processes depends on the selected level, there would be only 2 server processes. If the selected level is the application level, then there would need to be 100 server processes. A system requirement of 100 server processes may be too many for a system to support. However, only 2 server processes may be too few to handle all incoming work requests. Accordingly, in some implementations the system operator can select the number of server processes to employ, independent of the selected level within the hierarchy.

In this example, the number of server processes is set at 25 server processes. If the selected level in the hierarchy is the application level, then work requests for the 100 applications are distributed over the 25 server processes. That is, one server processes handles work requests for 4 applications.

Providing a system that is configurable such that the level in the hierarchy at which work is distributed, and the number of server processes employed are user-configurable and independent of one another, provides a flexible system that can be adapted for various operating conditions.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
    receiving a plurality of requests from a plurality of applications for access to one of n server processes, where n is an integer greater than 1, the n server processes comprise n core processes executing on a server and each request is for work for an application requesting work from the server;
    receiving a selection of a point within a hosting hierarchy at which to distribute requests to the n server processes, wherein the hierarchy includes a plurality of hierarchical levels including a media server at a first level, one or more adaptors at a second level, one or more virtual hosts at a third level, one or more applications at a fourth level and one or more application instances at a fifth level, and wherein the selected point is one of the hierarchical levels; and
    for each of the plurality of requests:
        extracting a portion of an identifier based on the selected point in the hierarchy, wherein the identifier is associated with the request and corresponds to the application that made the request and wherein the identifier includes information to determine two or more hierarchical levels in the hosting hierarchy that will receive the work corresponding to the request and extracting a portion of the identifier comprises ignoring information in the identifier about hierarchical levels below the selected point in the hosting hierarchy;
        applying a mixing function to the portion of the identifier to generate a reproducible output representative of the identifier;
        applying a modulo operation to the output, where a dividend in the modulo operation is the output and a divisor in the modulo operation is n, to determine a remainder; and
        assigning the request to a server process from the n server processes in accordance with the remainder;
    wherein applying the mixing function, applying the modulo operation and assigning the request are performed by one or more programmable processors of one or more computers.

2. The method of claim 1, wherein the mixing function comprises a hash function.

3. The method of claim 1, wherein the identifier comprises a universal resource identifier.

4. The method of claim 1, wherein n comprises a prime number.

5. The method of claim 1, wherein the number of server processes, n, is independent of the point selected within the hosting hierarchy.

6. A non-transitory computer-readable storage medium encoded with a computer program product, the computer program product comprising instructions operable to cause data processing apparatus to perform operations comprising:
    receiving a plurality of requests from a plurality of applications for access to one of n server processes, where n is an integer greater than 1, the n server processes comprise n core processes executing on a server and each request is for work for an application requesting work from the server;
    receiving a selection of a point within a hosting hierarchy at which to distribute requests to the n server processes, wherein the hierarchy includes a plurality of hierarchical levels including a media server at a first level, one or more adaptors at a second level, one or more virtual hosts at a third level, one or more applications at a fourth level and one or more application instances at a fifth level, and wherein the selected point is one of the hierarchical levels; and
    for each of the plurality of requests:
        extracting a portion of an identifier based on the selected point in the hierarchy, wherein the identifier is associated with the request and corresponds to the application that made the request and wherein the identifier includes information to determine two or more hierarchical levels in the hosting hierarchy that will receive the work corresponding to the request and extracting a portion of the identifier comprises ignoring information in the identifier about hierarchical levels below the selected point in the hosting hierarchy;

applying a mixing function to the portion of the identifier to generate a reproducible output representative of the identifier;

applying a modulo operation to the output, where a dividend in the modulo operation is the output and a divisor in the modulo operation is n, to determine a remainder; and assigning the request to a server process from the n server processes in accordance with the remainder.

7. The computer-readable non-transitory storage medium encoded with the computer program product of claim 6, wherein the mixing function comprises a hash function.

8. The computer-readable non-transitory storage medium encoded with the computer program product of claim 6, wherein the number of server processes, n, is independent of the point selected within the hosting hierarchy.

9. A system comprising:
one or more computers comprising a server having n server processes, where n is an integer greater than 1, each server process comprises a core process executing on the server and is configured to execute work in response to a work assignment; and
a work assignment engine, implemented using a computer, configured to perform operations comprising:
receiving a plurality of requests from a plurality of applications for access to the n server processes to perform work assignments for an application requesting work from the server;
receiving a selection of a point within a hosting hierarchy at which to distribute requests to the n server processes, wherein the hierarchy includes a plurality of hierarchical levels including a media server at a first level, one or more adaptors at a second level, one or more virtual hosts at a third level, one or more applications at a fourth level and one or more application instances at a fifth level, and wherein the selected point is one of the hierarchical levels; and
for each of the plurality of requests:
extracting a portion of an identifier based on the selected point in the hierarchy, wherein the identifier is associated with the request and corresponds to the application that made the request and wherein the identifier includes information to determine two or more hierarchical levels in the hosting hierarchy that will receive the work corresponding to the request and extracting a portion of the identifier comprises ignoring information in the identifier about hierarchical levels below the selected point in the hosting hierarchy;

applying a mixing function to the portion of the identifier to generate a reproducible output representative of the identifier;

applying a modulo operation to the output, where a dividend in the modulo operation is the output and a divisor in the modulo operation is n, to determine a remainder; and assigning the request to a server process of the n server processes in accordance with the remainder.

10. The system of claim 9, wherein the mixing function comprises a hash function.

11. The system of claim 9, wherein the number of server processes, n, is independent of the point selected within the hosting hierarchy.

* * * * *